United States Patent Office 2,855,407
Patented Oct. 7, 1958

2,855,407

REDUCTIVE AMINATION OF 2-ACETYL-3,4-(BIS HYDROXYMETHYL) FURAN AND ESTERS THEREOF

Wilbur B. McDowell, Milltown, and Heinz Moes, East Orange, N. J., assignors to Olin Mathieson Chemical Corporation, New York, N. Y., a corporation of Virginia No Drawing. Application January 25, 1956
Serial No. 561,362

6 Claims. (Cl. 260—347.7)

This invention relates to an improved process for reductively aminating ketones and more particularly to an improved process for converting 2-acetyl-3,4-bis(hydroxymethyl)furan or esters thereof to 2-($\alpha$-aminoethyl)-3,4-bis(hydroxymethyl)furan.

The synthesis of pyridoxine from furan derivatives involves the utilization of the intermediate compound, 2-($\alpha$-aminoethyl)-3,4-bis(hydroxymethyl)furan or esters thereof (see U. S. patent application of Clauson-Kaas et al., Serial No. 547,888, filed November 10, 1955). Prior to this invention, this intermediate was prepared, as disclosed in said application, by reacting 2-acetyl-3,4-bis(hydroxymethyl)furan or an ester thereof with liquid ammonia and hydrogen in a substantially anhydrous system (e. g. in methanol) under extremely high pressure and temperature conditions.

Although this priorly known process produces the desired 2-($\alpha$-aminoethyl)-3,4-bis(hydroxymethyl)furan in satisfactory yield, it suffered the real disadvantage of being a high pressure reaction which required specialized equipment able to withstand the requisite pressures of 100 to 200 atmospheres (1400 to 2900 p. s. i. g.). Furthermore, since this process must be conducted under substantially anhydrous conditions, it required the use of liquid ammonia with the attendant disadvantage that the reaction vessel had to be precooled to a temperature below −34° C. to maintain the ammonia in a liquid state during the charging of the reaction vessel. Another disadvantage of this process resided in the fact that the reaction was conducted under anhydrous conditions; hence, if a pyrophoric nickel was used as the hydrogenation catalyst, the nickel (which is obtained commercially as an aqueous suspension) had to be first rendered anhydrous before use by substitution of an organic solvent, such as methanol, for the water. An additional disadvantage of this process resided in the fact that the reaction was effected in a flammable solvent over a pyrophoric catalyst, so that if one or more particles of the catalyst became nearly dry in the presence of air the dry particle could ignite the residual solvent, thereby in turn igniting any highly flammable substances in the immediate vicinity.

It is an object of this invention, therefore, to provide for a lower-pressure process for reductively aminating 2-acetyl-3,4-bis(hydroxymethyl)furan or an ester thereof to 2-($\alpha$-aminoethyl)-3,4-bis(hydroxymethyl)furan.

Another object of this invention is to provide for a process to effect the reductive amination under aqueous conditions, whereby the use of liquid ammonia, flammable solvents, and anhydrous catalyst is obviated.

Yet another object of this invention is to provide for a hydrogenation process which can be carried out using a commercially available nickel catalyst in the state in which it is supplied by the manufacturers, viz. as an aqueous slurry, thereby eliminating the need for rendering the catalyst anhydrous.

These objects are achieved by the process of this invention, which essentially comprises interacting 2-acetyl-3,4-bis(hydroxymethyl)furan or an ester thereof, ammonium hydroxide and hydrogen in an aqueous system in the presence of a hydrogenation catalyst. The 2-($\alpha$-aminoethyl)-3,4-bis(hydroxymethyl)furan produced may then be recovered as such or converted in situ to pyridoxine as more fully disclosed hereinafter.

The 2-acetyl-3,4-bis(hydroxymethyl)furan reactant is preferably present in the form of the free dihydroxy compound but can also be used in the form of its mono or diester, particularly mono or di(lower alkanoic acid) ester (e. g. as an acetate). The ammonia can be introduced into the reaction mixture as liquid ammonia, but preferably is in the form of ammonium hydroxide, which under optimal conditions represents an ammonia concentration from about 10% to about 30% by weight of water present in the system. The ratio of ammonia to ketone is not critical and can be as low as the stoichiometric requirement of 1:1, but preferably for the sake of increased yield is present in an excess of at least 4:1 and optimally 10:1 or greater ratio. Since the reaction is most advantageously carried out under an atmosphere of hydrogen, the hydrogen reactant is present in excess, although as little as one mole of hydrogen per mole of furan is operative.

Any hydrogenation catalyst which will promote selective reductive amination of the carbonyl group and does not lead to reduction of the furan ring is utilizable in the process of this invention. A preferred catalyst, however, is an activated form of nickel, such as sponge nickel or Raney nickel. In contrast to the previously known process, the method of this invention can be conducted at room temperature, although preferably it is carried out at a temperature in the range of about 50° C. to about 75° C. (optimally about 60° C. to about 65° C.), and at a hydrogen pressure as low as about one atmosphere [preferably at a pressure in the range of about 40 to about 60 p. s. i. g. (pounds per square inch gauge)].

The following examples illustrate the invention:

Example 1

17.0 g. of 2-acetyl-3,4-bis(hydroxymethyl)furan is dissolved in 100 ml. of concentrated ammonium hydroxide (28% ammonia). This solution is charged to a hydrogenation along with about 4 g. of activated nickel [7 ml. of Davison sponge nickel catalyst as received (50% aqueous slurry)]. The apparatus is evacuated and purged with hydrogen seven times. A hydrogen pressure of 50 p. s. i. g. is established in a system containing an excess of hydrogen over that required for the reaction and the mixture is agitated and heated. The temperature rises to 60° C. in three-fourths of an hour. The temperature is then maintained at 60–66° C. for six hours and the reaction mixture allowed to cool to room temperature with continued agitation. The pressure is released and the catalyst removed by filtration through a filter (with the aid of Hyflo). The residue is washed twice with 50 ml. of water, the washings being combined with the filtrate. The resulting tan solution is concentrated and the residual oil is dissolved in 50 ml. of methanol and filtered to remove greenish solids. The methanol is then evaporated leaving about 17.1 g. of 2-($\alpha$-aminoethyl)-3,4-bis(hydroxymethyl)furan as a viscous brown oil. The infrared spectrum of this material is identical with that of a standard sample of 2-($\alpha$-aminoethyl)-3,4-bis(hydroxymethyl)furan.

The 2-($\alpha$-aminoethyl)-3,4-bis(hydroxymethyl)furan formed can be converted directly to pyridoxine without further purification as illustrated by the following example:

Example 2

The 17.1 gms. of viscous brown oil obtained by the procedure of Example 1 is dissolved in a soltuion of 36 ml. of methanol in 100 ml. of water and cooled to 0° C. 7.1 gms. of chlorine is added during about 10 minutes with good agitation and external cooling to maintain a temperature of 0°±5° C. The solution is heated on a steam bath and maintained for 20 minutes at 80-90° C. 2 gms. of activated charcoal (Darco G-60) is added to the warm solution and the mixture stirred for 10 minutes. The mixture is filtered and the residue washed with 25 ml. of water. The combined filtrate and wash is concentrated with addition of n-butanol and vaporization of the butanol-water azeotrope. The final volume after complete removal of water is about 250 ml. The resulting slurry of pyridoxine hydrochloride in n-butanol is cooled to about 5° C. and maintained at this temperature for 2 hours. The crystalline pyridoxine hydrochloride (M. P. about 206-207° C.) is removed by filtration and dried to give a yield of about 12.4 gms. (60% of theory).

In a manner similar to the procedure of these examples, the following runs were made using, unless indicated otherwise, 0.1 mole (17.0 g. of 2-acetyl-3,4-bis-(hydroxymethyl)furan and 100 ml. of concentrated ammonium hydroxide (28% ammonia):

| Example | Nickel Catalyst (ml.) | Reduction Time (hours) | Reduction Temperature (°C.) | Yield of Pyridoxine (Percent) |
|---|---|---|---|---|
| 3 | 7 Davison | 16 | 40-44 | 51.8 |
| 4 | 5 Raney | 9 | 58-69 | 62.4 |
| 5 | 14 Davison | 7 | 60-64 | 55.8 |
| 6 | 5 Raney | 2 | 60-66 | 45.3 |
| 7 | 5 Raney (only 8.5 g. of ketone used). | 6 | 60-66 | 50.2 |
| 8 | 7 Davison (mixture of 50 ml. conc. ammonium hydroxide and 25 ml. water). | 8 | 60-67 | 58.3 |
| 9 | 5 Raney | 6 | 62-68 | 56.9 |
| 10 | 7 Davison (mixture of 50 ml. conc. ammonium hydroxide and 50 ml. water). | 7 | 63-68 | 59.5 |
| 11 | 7 Davison | 7.25 | 65-74 | 58.5 |
| 12 | ----do---- | 20 | 79-87 | 49.2 |

If 2-acetyl-3,4-bis(acetoxymethyl)furan is substituted for the 2-acetyl-3,4-bis(hydroxymethyl)furan in the procedure of Example 1, 2-(α-aminoethyl)-3,4-bis(hydroxymethyl)furan is obtained. Similarly, other mono- and diesters of 2-acetyl-3,4-bis(hydroxymethyl)furan can be substituted for the free dihydroxy furan.

The invention may be otherwise variously embodied within the scope of the appended claims.

We claim:
1. A process which comprises interacting a ketone selected from the group consisting of 2-acetyl-3,4-bis(hydroxymethyl)furan and esters thereof with ammonium hydroxide and hydrogen, under a hydrogen pressure in the range of about zero to about 60 pounds per square inch gauge, in an aqueous system in the presence of a hydrogenation catalyst.

2. The process of claim 1 wherein the ketone is 2-acetyl-3,4-bis(hydroxymethyl)furan.

3. The process of claim 2 wherein the hydrogenation catalyst is an activated form of nickel.

4. A process which comprises heating 2-acetyl-3,4-bis(hydroxymethyl)furan with ammonium hydroxide and hydrogen, under a hydrogen pressure in the range of about zero to about 60 pounds per square inch gauge, in an aqueous system in the presence of an activated form of nickel as the hydrogenation catalyst and recovering the 2-(α-aminoethyl)-3,4-bis(hydroxymethyl)furan formed.

5. The process of claim 4 wherein the heating is done in a temperature range of about 50° C. to about 75° C.

6. The process of claim 5 wherein the reaction is conducted under a hydrogen pressure in the range of about 40 to 60 pounds per square inch gauge.

References Cited in the file of this patent
UNITED STATES PATENTS

| | | |
|---|---|---|
| 2,045,574 | Adkins | June 30, 1936 |
| 2,109,159 | Winans | Feb. 22, 1938 |
| 2,636,902 | Taylor | Apr. 28, 1953 |

OTHER REFERENCES

Adams: Organic Reactions, vol. No. 4, chap. #3, pages 174-255 (1948).